(12) United States Patent
Postnikov et al.

(10) Patent No.: US 9,619,919 B1
(45) Date of Patent: Apr. 11, 2017

(54) SYNTHETIC ENVIRONMENTS WITH STEREOSCOPIC AVIONICS DISPLAYS SYSTEM AND RELATED METHOD

(71) Applicant: Rockwell Collins, Inc., Cedar Rapids, IA (US)

(72) Inventors: Alex Postnikov, Cedar Rapids, IA (US); Tracy J. Barnidge, Marion, IA (US); Timothy J. Etherington, Hampton, VA (US); Jason C. Wenger, Cedar Rapids, IA (US); Joseph L. Tchon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 803 days.

(21) Appl. No.: 13/720,330

(22) Filed: Dec. 19, 2012

(51) Int. Cl.
*G06T 15/00* (2011.01)
*G06F 3/14* (2006.01)
*B64D 43/00* (2006.01)
*H04L 29/08* (2006.01)

(52) U.S. Cl.
CPC ............ *G06T 15/005* (2013.01); *B64D 43/00* (2013.01); *G06F 3/1423* (2013.01); *G09G 2354/00* (2013.01); *G09G 2370/022* (2013.01); *G09G 2380/12* (2013.01); *H04L 67/08* (2013.01)

(58) Field of Classification Search
CPC ....... H04L 67/12; H04L 67/08; G06F 3/1423; G09G 2354/00; G09G 2370/022; G09G 2380/12; B64D 43/00; G04T 15/005
See application file for complete search history.

(56) References Cited

U.S. PATENT DOCUMENTS

| 8,725,318 | B1 * | 5/2014 | McCusker | H04L 67/12 701/3 |
| 2003/0179109 | A1 * | 9/2003 | Chamas | G01C 23/005 340/973 |
| 2011/0125614 | A1 * | 5/2011 | Dollens | G06Q 30/0603 705/27.2 |
| 2013/0033483 | A1 * | 2/2013 | Im | G06F 3/0482 345/419 |
| 2013/0323686 | A1 * | 12/2013 | Wenger | G09B 9/08 434/29 |

* cited by examiner

*Primary Examiner* — Behrooz Senfi
*Assistant Examiner* — Maria Vazquez Colon
(74) *Attorney, Agent, or Firm* — Angel N. Gerdzhikov; Donna P. Suchy; Daniel M. Barbieri

(57) ABSTRACT

A method and system are disclosed for stereoscopic three dimensional (S3D) display of synthetic environment (SE) data simultaneously with operational symbology data to the operator of a vehicle. The method receives a plurality of data objects and places the objects within a plurality of levels of a presentation hierarchy and further within a plurality of S3D depth layers based on a set of data and operator focused rules. The method simultaneously displays to the operator each of the plurality of objects in the plurality of S3D depth layers according to the placement. The method transitions an object from one depth layer to a more proximal or distal depth layer to indicate relative motion or urgency. The method reserves a depth layer most proximal to the operator for a warning while a most distal set of depth layers is reserved for SE objects.

20 Claims, 13 Drawing Sheets

| | |
|---|---|
| 1302 | receiving a plurality of objects, each of the plurality of objects an instance of one of: Synthetic Environment (SE) data and operational symbology data, for a vehicle |
| 1304 | determining a presentation hierarchy of the plurality of objects, the presentation hierarchy having a plurality of levels |
| 1306 | determining a first placement within the presentation hierarchy for each object |
| 1308 | designating a plurality of S3D depth layers for a display of operational data |
| 1310 | determining a first order of the plurality of objects within the plurality of S3D depth layers |
| 1312 | reserving a proximal depth layer to the operator for a warning indication |
| 1314 | displaying, in the display of operational data in the vehicle, the plurality of objects within a highest level of the presentation hierarchy at the proximal depth layer |
| 1316 | displaying, in the display of operational data in the vehicle, the plurality of objects within a lowest level of the presentation hierarchy at a distal depth layer from the operator |
| 1318 | displaying, in the display of operational data in the vehicle, the plurality of objects within a plurality of intermediate levels of the presentation hierarchy at a plurality of intermediate depth layers based on the first placement and the first order, the proximal depth layer, the distal depth layer, and the intermediate depth layers are simultaneously displayed |
| 1320 | transitioning an object from a more proximal depth layer to a more distal depth layer and vice versa |
| 1322 | determining a second placement and a second order |
| 1324 | displaying, in the S3D display of operational data in the vehicle, the plurality of objects based on the transitioning, the second placement and the second order |

SYNTHETIC ENVIRONMENTS WITH STEREOSCOPIC AVIONICS DISPLAYS SYSTEM AND RELATED METHOD

FIELD OF THE INVENTION

The present invention relates generally to display of information to an operator of a vehicle. More particularly, embodiments of the present invention relate to a system and method for decluttered stereoscopic display of system generated synthetic environments to an operator of a vehicle.

BACKGROUND OF THE INVENTION

As tools for gathering and displaying data evolve, operators are presented with increasing information. In the case of an airborne operator, such information may include basic flight data, aircraft system data, terrain and obstacle data, and targeting data. With limited screen area for traditional 2-D presentation of this information to a pilot, a desirably sized presentation may become cluttered with displayed information. Such clutter may lead to misinformation, pilot information overload, and ultimate pilot miscommunication of critical system information.

Additionally, when 2-D symbology is overlaid on top of a Synthetic Environment (SE) single screen aircraft display, clutter may become a serious barrier to desired visual information communication. Display clutter becomes an increasing issue when, in addition to the 2-D symbology, the lines and other features presented in SE start to compete for the same 2-D screen space on the display surface. For example, a terrain display presenting power lines as straight or slightly curved lines may interfere with straight lines of a displayed pitch ladder. Such interference may lead to pilot confusion.

Multiple SE contexts may also interfere with each other, such as terrain with weather. The problem may become especially apparent when colors of individual SE elements are close to each other. For example, a red weather thunderstorm cell and a red terrain warning.

Three dimensional (3-D) presentations are well-known in the art of display technology. Additionally, stereoscopic 3-D (S3D) displays have been viewed dating back to the double-image manually handheld stereoscope. Many of these displays are capable of communicating more information than a simple 2-D display. This increased amount of information may prove valuable to a viewer. However, within the cockpit of a vehicle, a severe limitation on screen space requires a single display to communicate information.

Therefore, a need exists for a system and method for simultaneous display of SE and operational symbology information to an operator where a hierarchy of individual elements of desired system-to-pilot communication is stereoscopically presented in a plurality of S3D depth layers.

SUMMARY OF THE INVENTION

Accordingly, an embodiment of the present invention is directed to a method for stereoscopic three dimensional (S3D) display of multiple layers of information to an operator, comprising: receiving a plurality of objects, each of the plurality of objects an instance of one of: Synthetic Environment (SE) data and operational symbology data, for a vehicle, determining a presentation hierarchy of the plurality of objects, the presentation hierarchy having a plurality of levels, determining a first placement within the presentation hierarchy for each object of the plurality of objects, designating a plurality of S3D depth layers for a display of operational data, determining a first order of the plurality of objects within the plurality of S3D depth layers, reserving a proximal depth layer to the operator, of the plurality of S3D depth layers, for a warning indication, displaying, in the display of operational data in the vehicle, the plurality of objects within a highest level of the presentation hierarchy at the proximal depth layer, displaying, in the display of operational data in the vehicle, the plurality of objects within a lowest level of the presentation hierarchy at a distal depth layer from the operator, displaying, in the display of operational data in the vehicle, the plurality of objects within a plurality of intermediate levels of the presentation hierarchy at a plurality of intermediate depth layers based on the first placement and the first order, the proximal depth layer, the distal depth layer, and the intermediate depth layers are simultaneously displayed, transitioning an object from a more proximal depth layer to a more distal depth layer and vice versa, determining a second placement and a second order, and displaying, in the S3D display of operational data in the vehicle, the plurality of objects based on the transitioning, the second placement and the second order.

A further embodiment of the present invention is directed to a system for stereoscopic three dimensional (S3D) display of multiple layers of information to an operator, comprising: a graphics engine configured to receive a plurality of objects, each of the plurality of objects an instance of one of: Synthetic Environment (SE) data and operational symbology data, for a vehicle, a computer readable medium having non-transitory computer readable program code embodied therein for S3D display of multiple layers of information to the operator, the computer readable program code comprising instructions which, when executed by a computer device or processor, perform and direct the steps of: determining a presentation hierarchy of the plurality of objects, the presentation hierarchy having a plurality of levels, determining a first placement within the presentation hierarchy for each object of the plurality of objects, designating a plurality of S3D depth layers for a display of operational data, determining a first order of the plurality of objects within the plurality of S3D depth layers, reserving a proximal depth layer to the operator, of the plurality of S3D depth layers, for a warning indication, a display controller configured to receive information from the processor, and output graphics information to a display, the display configured to: display, in the display of operational data in the vehicle, the plurality of objects within a highest level of the presentation hierarchy at the proximal depth layer, display, in the display of operational data in the vehicle, the plurality of objects within a lowest level of the presentation hierarchy at a distal depth layer from the operator, display, in the display of operational data in the vehicle, the plurality of objects within a plurality of intermediate levels of the presentation hierarchy at a plurality of intermediate depth layers based on the first placement and the first order, the proximal depth layer, the distal depth layer, and the intermediate depth layers simultaneously displayed, the computer device or processor further configured to perform and direct the steps of: transitioning an object from a more proximal depth layer to a more distal depth layer and vice versa, determining a second placement and a second order, the display further configured to: display, in the S3D display of operational data in the vehicle, the plurality of objects based on the transitioning, the second placement and the second order.

An additional embodiment of the present invention is directed to a system where the operator is an onboard or remote pilot, and the vehicle is an aircraft, and the display of operational data further comprises a display configured for S3D recognition by the operator without a need for the operator to wear a specific filter or eyewear including filters.

In an additional embodiment, the warning further comprises at least one of: a master warning, a master caution, a terrain warning, an obstacle warning, a vehicle status message, a fuel warning, a weapons status warning, and a communication warning.

In yet an additional embodiment, the Synthetic Environment (SE) data further comprises at least one of: navigation data, vehicle status data, obstacle data, terrain data, weather data, traffic data, and targeting data and the operational symbology data further comprises at least one of: speed data, altitude data, attitude data, heading data, navigation data, weapons data, and targeting data.

In an additional embodiment, the presentation hierarchy further comprises an order based at least on one of: an operational requirement, an indication of a source of the objects, a Security Classification of the objects, and an order of receipt of the plurality of objects and the plurality of S3D depth layers further comprise an order based at least on one of: a danger to the vehicle, a skill level of the operator, a Security Clearance of the operator, a master mode of an onboard control computer, and a mission of the operator.

In an additional embodiment, the display of operational data in the vehicle is configured for projection from at least one of: an instrument panel display and a helmet mounted display and the displaying further comprises: a multi-dimensional link line from at least one depth layer of the plurality of S3D depth layers to one of: the more proximal depth layer and the more distal depth layer of the plurality of S3D depth layers.

In yet an additional embodiment, the display of operational data is configured via at least one of: virtually by a software module, optically without an S3D display, a set or pair of eyewear with filters worn by the operator, and modules within the display.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 13 is a flow diagram of a method for displaying synthetic environments with stereoscopic avionics displays representative of a preferred embodiment of the present invention.

DETAILED DESCRIPTION OF THE INVENTION

Figure 1:
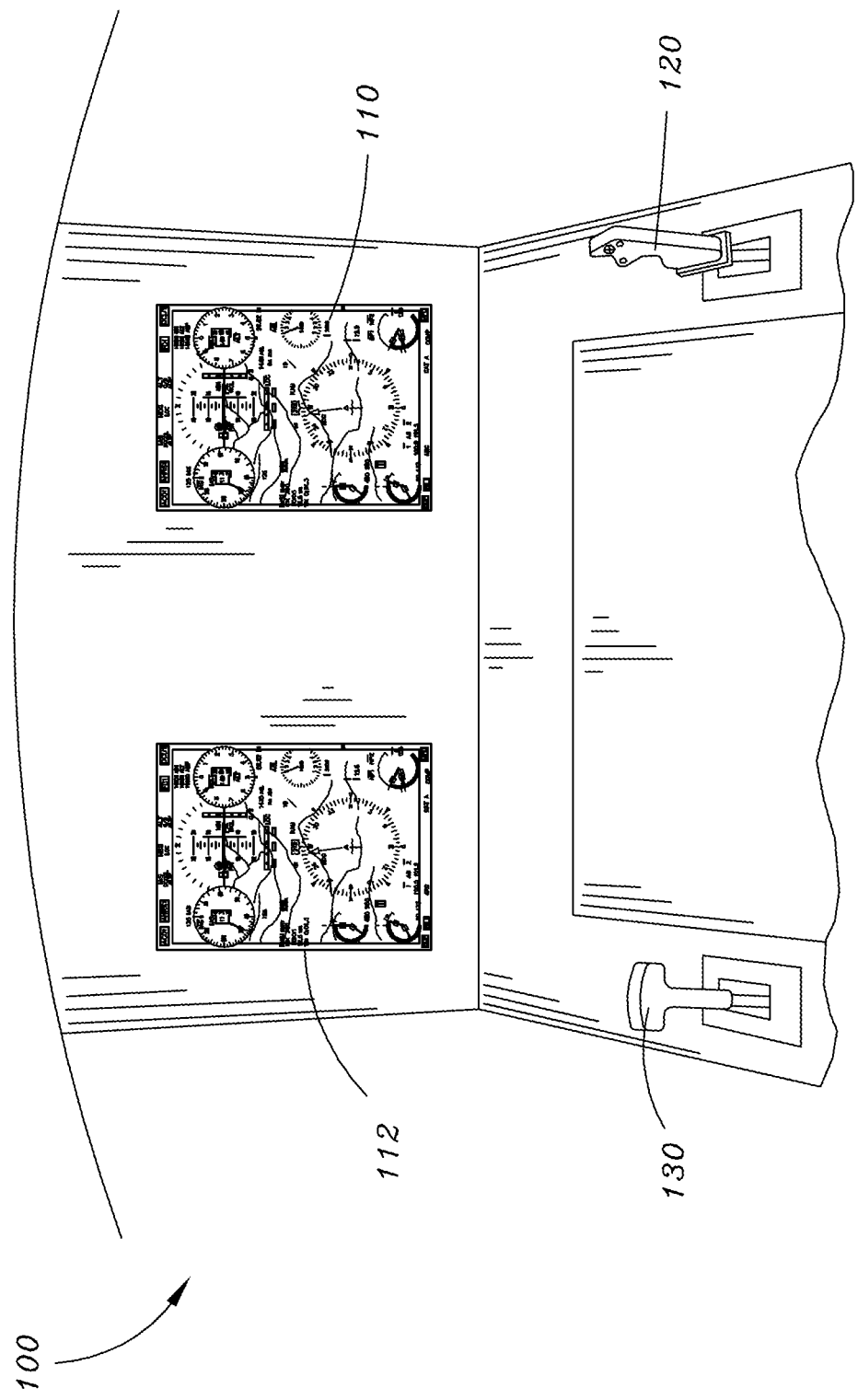
FIG. 1 is an overview of an exemplary cockpit layout in accordance with a preferred embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a method and system for simultaneous display of SE data with operation symbology on a single S3D display to an operator of a vehicle. Preferably, the operator is an onboard or remote pilot and the vehicle is an aircraft. However, embodiments of the present invention may be specifically configured for additional types of vehicles whose operators may require operational data to operate the vehicle. For example, a single seat fighter aircraft or multi-seat helicopter may particularly benefit from embodiments of the present invention. As these aircraft may be required to fly tactical missions at low altitude, S3D depth layer separation in a presentation of operational data may increase situational awareness, increase tactical capabilities, and ultimately increase mission success.

An additional example may include a S3D display of operational data in an automobile. Embodiments of the present invention may be specifically configured to display to a driver SE data from a camera oriented to image the rear direction of the vehicle. Overlaid upon this SE data may be speed, heading and fuel quantity for the vehicle. An operator may enjoy considerable situational awareness with this increased capability to optionally view objects to the rear of the vehicle.

S3D graphics may include generating binocular depth cues through the use of a 3-D display that can deliver two or more independent views. The term "stereoscopic" as used herein is associated with 3-D displays that require eyewear while the term "autostereoscopic" as used herein is associated with 3-D displays that do not require eyewear. Head or helmet mounted displays that are able to present separate left and right eye views represent another embodied variation of the invention disclosed herein.

Methods of stereoscopic display embodied herein may preferably separate from and simultaneously display a 2-D image plane from 3-D content of the SE. In some embodiments, it may appear to the operator that the instrument panel happens to be much closer to the observer than the rest of the 3D content. To the operator, the critical instruments may be presented apparently in front of the remaining visual content. As presented in this manner, it may be nearly impossible for the operator to confuse information presented in the more proximal critical instrument depth layer with information presented in the more distal depth layers. In preferred embodiments, SE presentations do not appear as a flat panel 2-D representation of 3-D topography. Rather, the SE is perceived by the operator as a true 3-D stereo image.

As used herein, the word "display" may include reference to a physical screen. For example, a multi-function display (MFD) mounted to a glare shield of a vehicle or a combiner glass mounted as a head up display or internally to a helmet mounted device. Also, the word display may be used in reference to objects a person may visually perceive when looking toward a screen.

Referring to FIG. 1, an overview of an exemplary cockpit layout in accordance with a preferred embodiment of the present invention is shown. Cockpit 100 may be comprised of right display 110 and left display 112. Preferred displays may include well-known flat panel touch screen devices as well as a device configured for a visual S3D display. It is contemplated herein throttle 130 and stick 120 may possess hands on throttle and stick (HOTAS) controls configured to operate modes and manipulate presentations of each display 110, 112. In addition to routine operation, it is contemplated herein the operator may discontinue use of the S3D displays described herein when desired. As safety may be one primary goal of an operator, optional HOTAS disconnect from an enhanced display may promote a safe operation.

Figure 2:
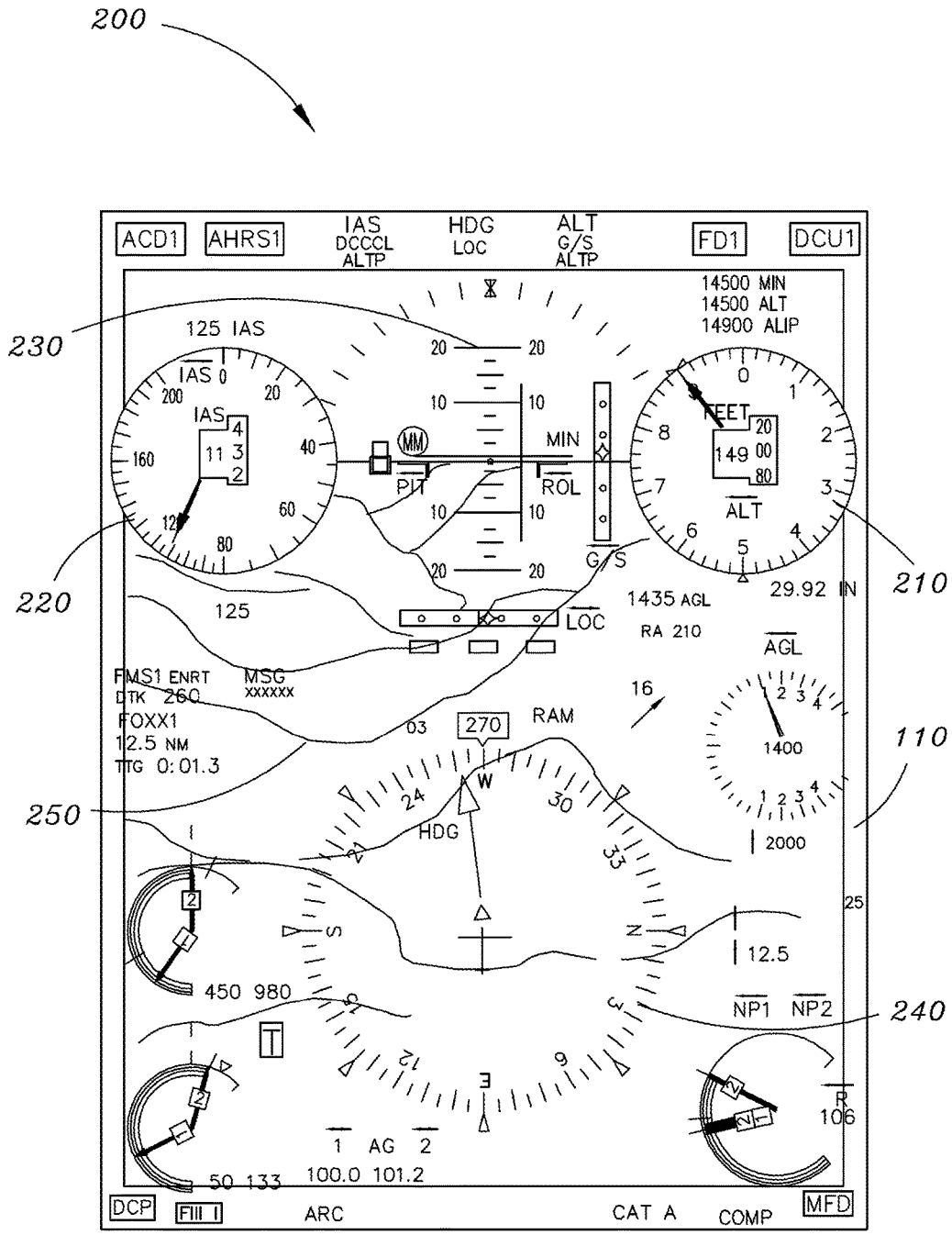
FIG. 2 is an exemplary display of cluttered symbology elements overlaid upon SE elements in accordance with preferred embodiment of the present invention.

Referring to FIG. 2, exemplary display of cluttered symbology elements overlaid upon SE elements in accordance with preferred embodiment of the present invention is shown. Evidence of clutter is present in such a single display configured only for 2-D viewing. However, embodiments of the present invention may act to present individual components of the display in a plurality of S3D depth layers. Each component or object of the presentation may maintain its own depth layer to aid in operator recognition. Display 110 may preferably present a plurality of objects to an operator of a vehicle. Preferable objects may include altitude 210, airspeed 220, attitude information in a pitch ladder 230, heading information within a compass 240, and terrain data 250. Unfortunately, operator information overload may arise when each object is presented in a traditional 2-D format.

Figure 3:
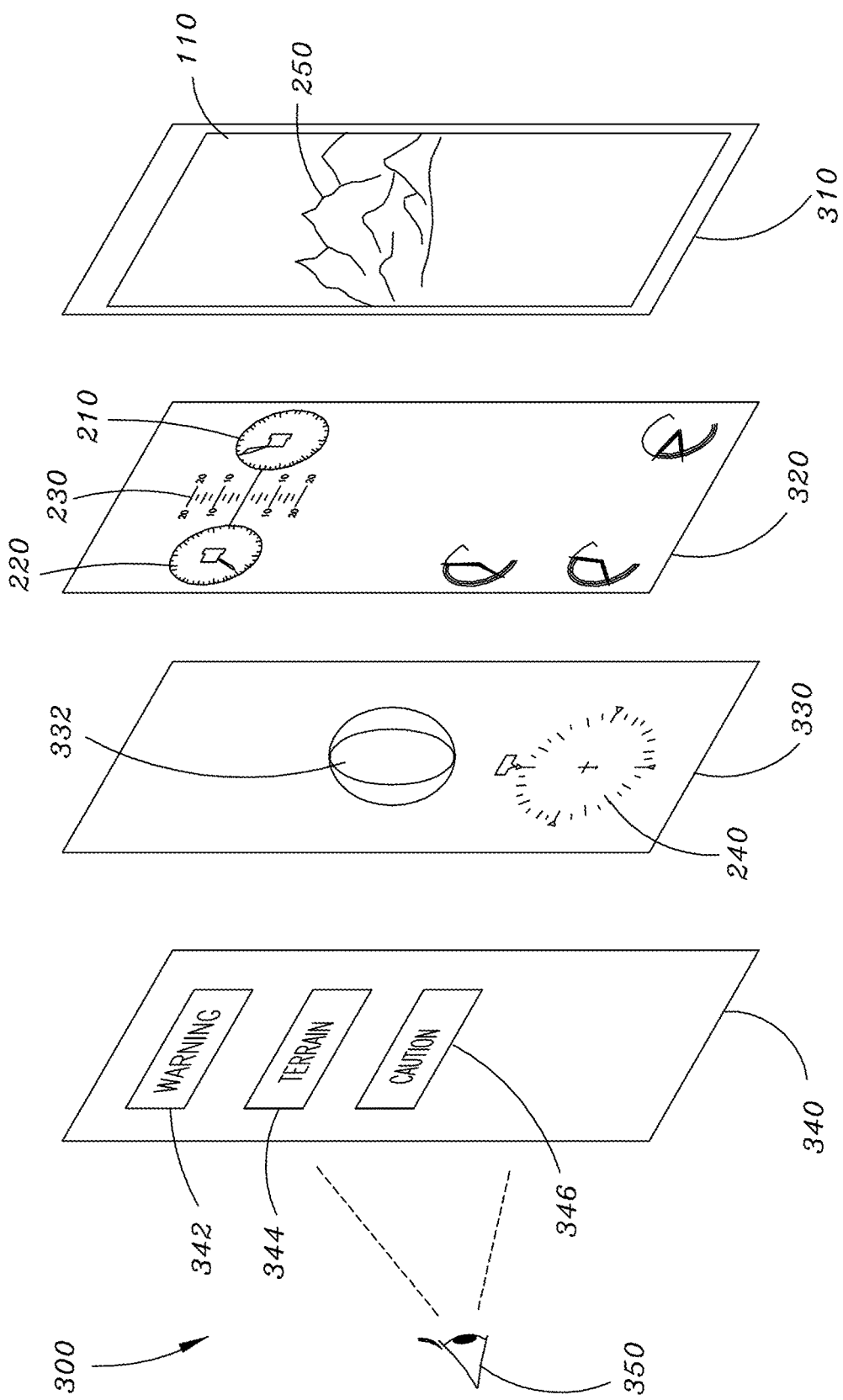
FIG. 3 is a diagram of an exemplary four depth layers of a stereoscopic 3-D cockpit display in accordance with a preferred embodiment of the present invention.

Referring to FIG. 3, diagram of an exemplary four depth layers of a stereoscopic 3-D cockpit display in accordance with a preferred embodiment of the present invention is shown. Embodiments of the present invention may include simultaneous display of SE data and operational symbology emanating from a single multi-function display (MFD) 110. At a distal depth layer 310 (or group of distal layers) as measured from an eye 350 of an operator, a preferable display of SE data may be appropriate. Here, the displayed SE data includes terrain data generated for display to a pilot. The SE data may include a presentation of 3-D data on a 2-D device using shading and other well-known 2-D methods of indicating depth on a 2-D screen. Although preferably, the SE data is presented to the operator in S3D layers capable of true S3D presentation offering the operator a valuable presentation of accurate SE data (here topography).

A true presentation embodiment of the present invention SE topography may include a plurality of SE layers with various aspects of the terrain presented to the operator at corresponding depth layers. For example, a near mountain would be presented at a proximal depth layer while a distant mountain presented at a more distal depth layer. Embodiments disclosed herein may be specifically capable of presenting each object of the SE data at a depth layer appropriate to the desired presentation to the operator.

A proximal depth layer 340 may be preferably reserved for emergency or warning indications to the operator. For example, should an engine failure occur, a well-known master warning or master caution indication would illuminate a rectangular light near the top of the cockpit glare shield of an aircraft. Embodiments of the present invention may preferably operate in a similar manner by bringing the warning indication closer to the operator. The proximal depth layer warning indication may present a warning to the operator capturing operator attention where more distal depth layers may not. A warning 342, terrain 344 and caution 346 indication at the proximal depth layer may provide maximum operator attention for emergency situations.

Color may also preferably help capture operator attention as well as a specific depth layer. For example, the color red has been traditionally reserved in a cockpit indication for emergency situations (e.g., fire, engine failure, wind shear). Well-known master warning lights are traditionally colored red. Embodiments of the present invention may color a warning 342 indication red, a terrain 344 indication red, and a caution 346 indication amber. This color combination coupled with the proximal depth layer 340 may enable embodiments of the present invention to capture the attention of the operator when it may be required.

Intermediate depth layers 320, 330 may preferably communicate valuable information to the operator through simultaneous display of operational symbology upon SE data. An exemplary two intermediate depth layers of objects are shown in FIG. 3. However, it is contemplated herein an unlimited number of intermediate depth layers may properly communicate and present information to the operator. One hierarchy of information displayed to the operator may include critical flight data at a more proximal intermediate depth layer 330. Such critical flight data may include attitude 332 and the compass 240. Traditional attitude indicators comprised a sphere gyroscopically positioned within a display filled with oil. Upon the sphere were markings to indicate a horizon, a pitch attitude, and angle of bank indications. Many pilots have used this "gyro" as a primary attitude reference when flying in instrument conditions. Therefore, many pilots are familiar with its use and operation. Here, embodiments of the present invention may present a sphere resembling the traditional gyro at an intermediate depth layer positioned for optimal pilot awareness.

At a more distal intermediate depth layer 320, information of a lesser criticality may be presented to the operator. A pitch ladder 230, airspeed 220, and altitude 210 may indicate valuable, however less critical information to the operator.

In a preferred embodiment, a link line may couple an object presented in one depth layer to an object presented in another depth layer. This interaction between depth layers may offer the operator a clutter free indication of a cause of the warning or caution. For example, an air traffic warning may be presented in the proximal depth layer 340 as a colored text box (orange or red). At the same time, a traffic symbol may be presented in a more distal depth layer 310 within the terrain 250 of the SE environment. Embodiments of the present invention may present a dashed or pulsing link line from the text box in the proximal depth layer 340 to the traffic symbol within the distal depth layer 310 to draw pilot attention from the warning box to the actual threat.

Link line color may also operate to distinguish the link line from additional displayed objects. For example, a red warning indication may be accompanied with a red pulsing link line. The link line may be visually attached to the red warning in proximal depth layer 340 and also attached to an altitude indicator 210 in intermediate depth layer 320. The red color of the link line may help distinguish the link line from additional symbology.

Figure 4:
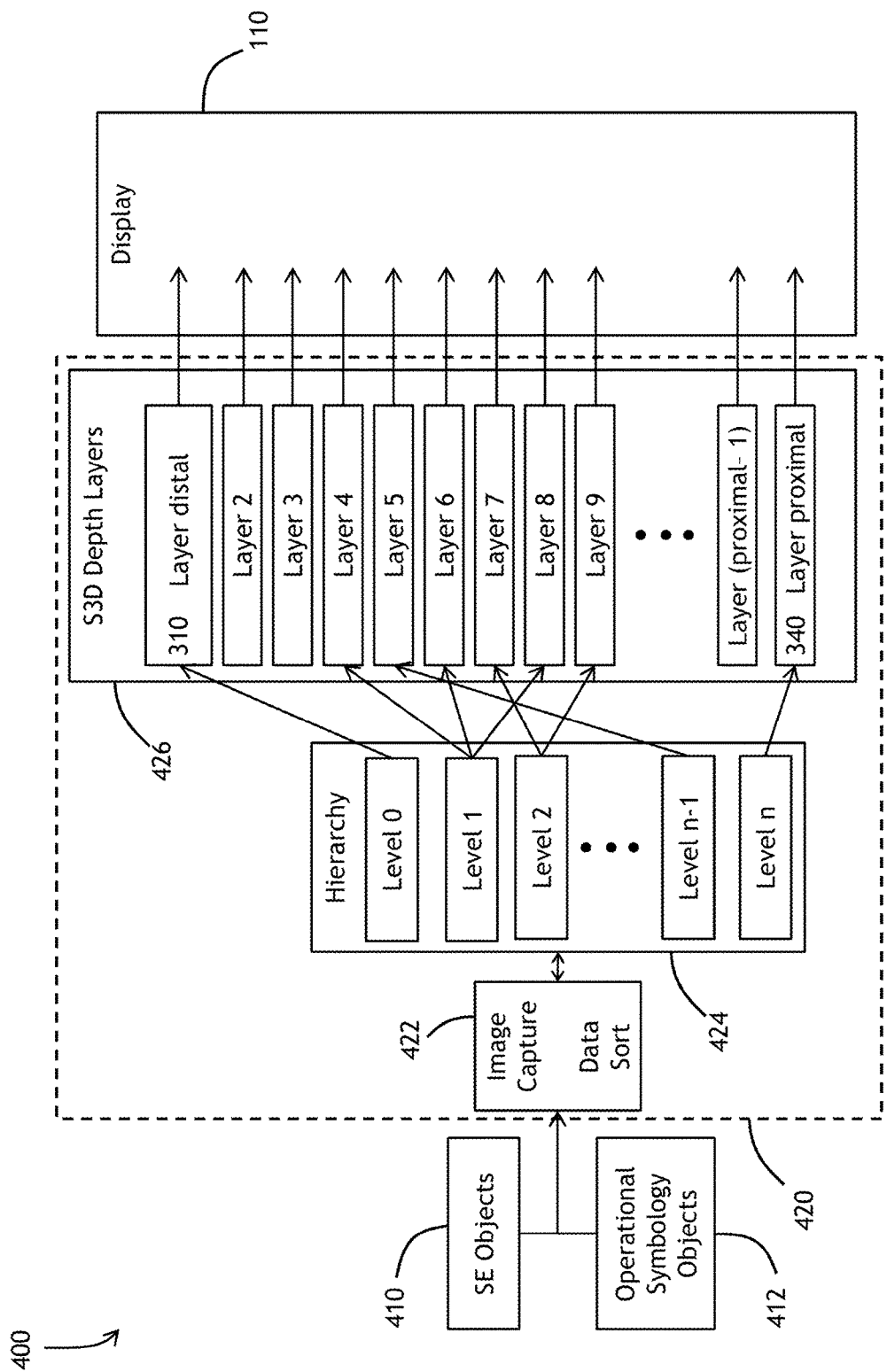
FIG. 4 is a diagram of a flow of data in an exemplary stereoscopic 3-D system in accordance with a preferred embodiment of the present invention.

Referring to FIG. 4, a diagram of a flow of data in an exemplary stereoscopic 3-D system in accordance with a preferred embodiment of the present invention is shown. System 400 may operate as the preferred system to generate a display of operational data and present SE objects simultaneously with symbology objects to the operator of a vehicle. Plurality of objects including SE objects 410 and operational symbology objects 412 may be received by system 400. As described herein, an SE object may comprise a plurality of objects which may simulate and represent an environment. For example, Digital Terrain Elevation Data (DTED) representing terrain may be one example of a preferable SE object presented by system 400. Additionally, exemplary SE objects may be in the form of video captured by a camera and returns received by a radar. In embodiments, SE objects are presented in a plurality of depth layers to the operator offering the operator a situational awareness tool to determine vehicle orientation with respect to the earth or other object.

Operational symbology data objects 412 may include those objects useful for an operator to successfully maneuver and employ the vehicle. For example, operational symbology data objects may include a pitch ladder 230 and attitude indicator 332. Additional operational symbology data objects may include targeting data and vehicle status information. For example, a launch acceptability region (LAR) may indicate to a pilot a specific launch window for an air-to-air or air-to-ground missile. Additionally, well-known objects critical to flight such as a flight path marker, horizon line, airspeed, altitude and the like may be acceptable inputs to system 400 as operational symbology data objects.

A first step in processing received objects in graphics engine 420 may be include image capture and data sort 422. For method 400 to properly present data objects to the operator, the received objects must first be sorted into a presentation hierarchy 424. Presentation hierarchy 424 may include a rules based approach to object placement based on the nature of the data object as well as additional factors. One embodiment of presentation hierarchy 424 may include a plurality of levels based on the type of data object received. For example, a SE terrain object may be placed in Level 0 while a warning SE object may be placed in Level n. Flexibility in rules for diverse operators and diverse vehicles may be one key to proper function of the hierarchy.

Presentation hierarchy 424 may also include a rules set based on a Classification of the object received. For example, a data object containing a classification between secret/no foreign and unclass may indicate a specific Level of the presentation hierarchy 424 in which the object should be placed. In addition, a rules set based on an operational requirement, an indication of a source of the objects, and an order of receipt of the plurality of objects are contemplated within the scope of this invention.

Once objects are first sorted into levels of the presentation hierarchy 424, system 400 may further sort the objects into S3D depth layers 426 based on additional rules. For example, one rule set embodied herein may include rules based on an operator's preference for display of objects in a specific layer. A depth layer proximal 340 to the eye 350 of the operator may be reserved for warning 342, 344, 346 indications while the most distal depth layer 310 may be reserved for SE data objects such as terrain 250.

Additional SE objects may be presented in similar fashion. For example, weather SE objects may be presented on distal depth layer 310 in a well-known color reference related to weather (e.g., red for heavy, green for moderate, yellow for light precipitation). Similarly, traffic SE objects may be presented in a variety of colors and depth layers depending on a threat level to the aircraft.

In additional embodiments, system 400 may operate under a set of rules to place objects in depth layers according to the nature of the operator. For example, a student operator may require a specific set of depth layers for successful operation while a seasoned veteran may require a more sophisticated presentation. An operator awaiting a security clearance may be denied certain information from system 400 based on the operator's status. It is contemplated herein, these operator based sets of rules may comprise a plurality of rules sets configured specifically for the various types of operators.

This depth layer concept may indicate to the operator a similar picture as one may experience without the aid of system 400. For example, flying in an unaided cockpit (without system 400), a pilot may look in the distance and see mountains 20 nautical miles (NM) from the aircraft. Focusing more proximal, the pilot may see an attitude gyro at arm's length from the eyes. Should an engine catch fire, the pilot may see a master warning light illuminate closer than the gyro on the instrument panel. This layered picture is one goal of system 400: to present objects to the operator in an order similar order to one in which the operator may have been trained.

In additional embodiments, specifically configured cameras or similar devices may be optimally positioned on an air-refueling boom to aid a boom operator in successful air refueling operation. Dual cameras on the boom may capture SE object data input to system 400 for presentation. Unlike a traditional rear station, a boom operator using system 400 may be positioned in any location within the tanker aircraft.

A rules set optimized for an onboard pilot operator may aid the pilot in successful operation of the aircraft whereas a rules set optimized for a ground based or remote operator of a vehicle may be substantially different. Once the rules set determines the hierarchy 424 and S3D depth layers 426, objects are transmitted to display 110 for presentation to the operator.

Figure 5:
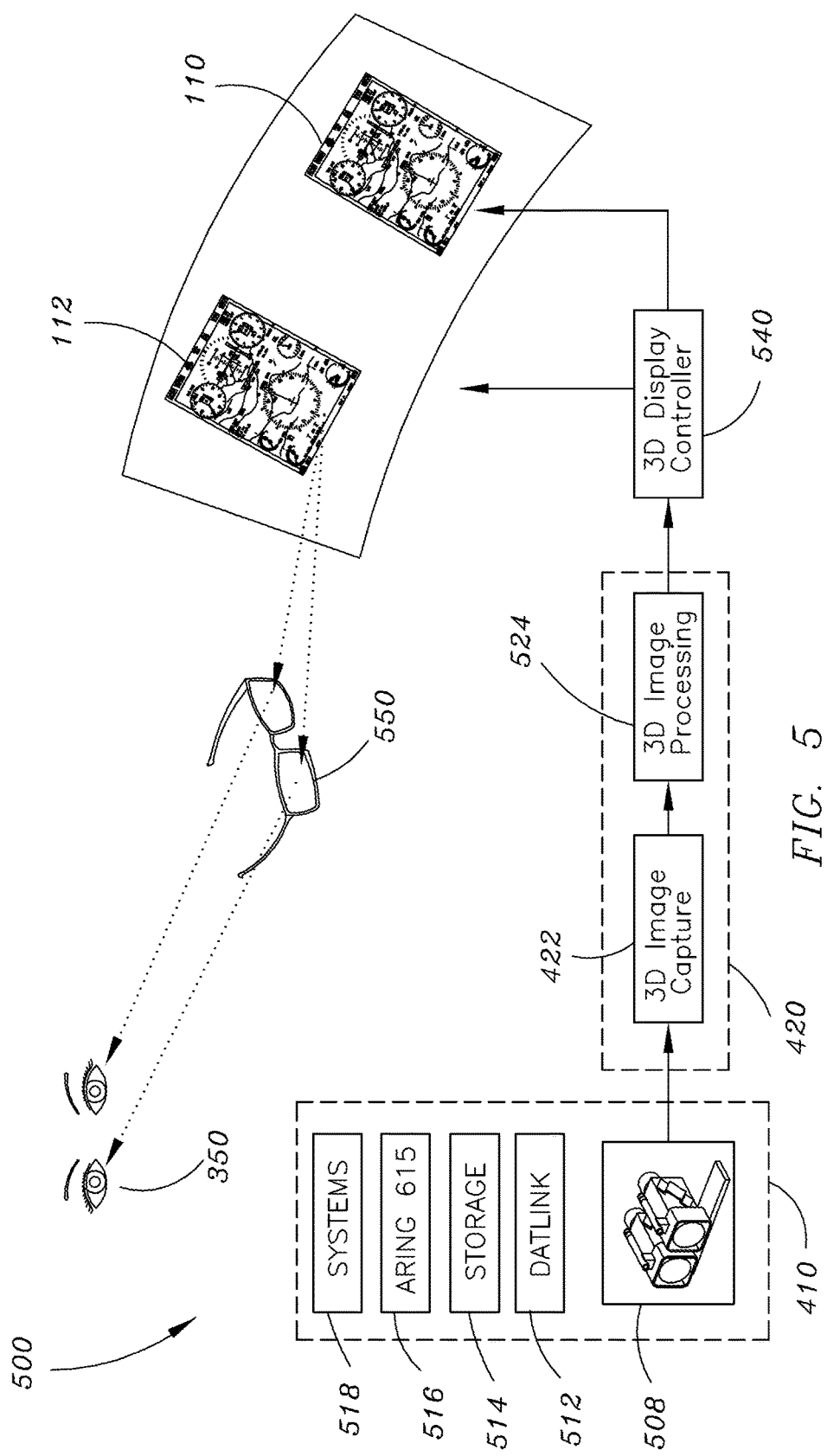
FIG. 5 is a diagram of an exemplary stereoscopic 3-D system in accordance with a preferred embodiment of the present invention.

Referring to FIG. 5, a diagram of an exemplary stereoscopic 3-D system in accordance with a preferred embodiment of the present invention is shown. System 500 may preferably include an input from a plurality of objects 410, the graphics engine 420, display controller 540, and displays 110, 112. Plurality of objects 410 may additionally exemplarily include a camera or similar passive device 508, a datalink 512, and onboard and offboard storage 514. Operational symbology may include data 516 configurable for an operational avionics standard such as an ARINC 615 standard of data, and systems data 518 representative of status of vehicle systems.

As graphic engine 420 receives data objects, image capture 422 may act as a conduit for data to enter processor 524. Processor 524 may embed computer readable code for carrying out the function of system 500. Display controller 540 may configure data for proper display on displays 110, 112.

In preferable embodiments, eyewear with filters 550 is not required for operator to properly perceive the autostereoscopic display of operational data via the naked eyes 350. For safety purposes, active or passive eyewear with filters are not required by preferred embodiments since one significant measure of safety may include a pilot's ability to see the critical flight instruments.

Autostereoscopic hardware and software may preferably accomplish the methods of system 500. With spatial multiplexed and spatial-temporal multiplexed display architecture, a fixed or switchable parallax barrier or lenticular array may operate within the scope of system 500. Further, volumetric displays including swept volume, layered, and voxel emitting architecture with emissive, FPD and intersecting lasers may operate within the scope of system 500. Further, light field display architecture including spatial multiplexed and distributed views may operate effectively within the scope of system 500.

However, in alternate embodiments, eyewear with filters 550 and other devices may offer additional capability to decode the separate images for the left and right eyes for generation of stereoscopic effect using synthetic environments in order for operator to perceive the display of operational data. In addition, it is contemplated herein, well-known additional stereoscopic hardware and software may add to the visual experience. Temporally multiplexed display architecture may be employed using one a narrow-band spectral accessory, a polarization switch, and an internal temporally multiplexed accessory. Spatially multiplexed architecture may employ a patterned retarder, an optical spatial multiplexing accessory, and a broadband spectral (anaglyph) accessory. In spatially aligned display architecture, eye-dedicated displays, physically aligned displays, and optically combined displays may operate within the scope of system 500. These images may be "encoded" by the display device using unique spectral color channels, polarization of light or temporal filters (use of shutter glasses, etc.). These contemplated embodiments include variants of S3D displays requiring eyewear to view.

Figure 6:
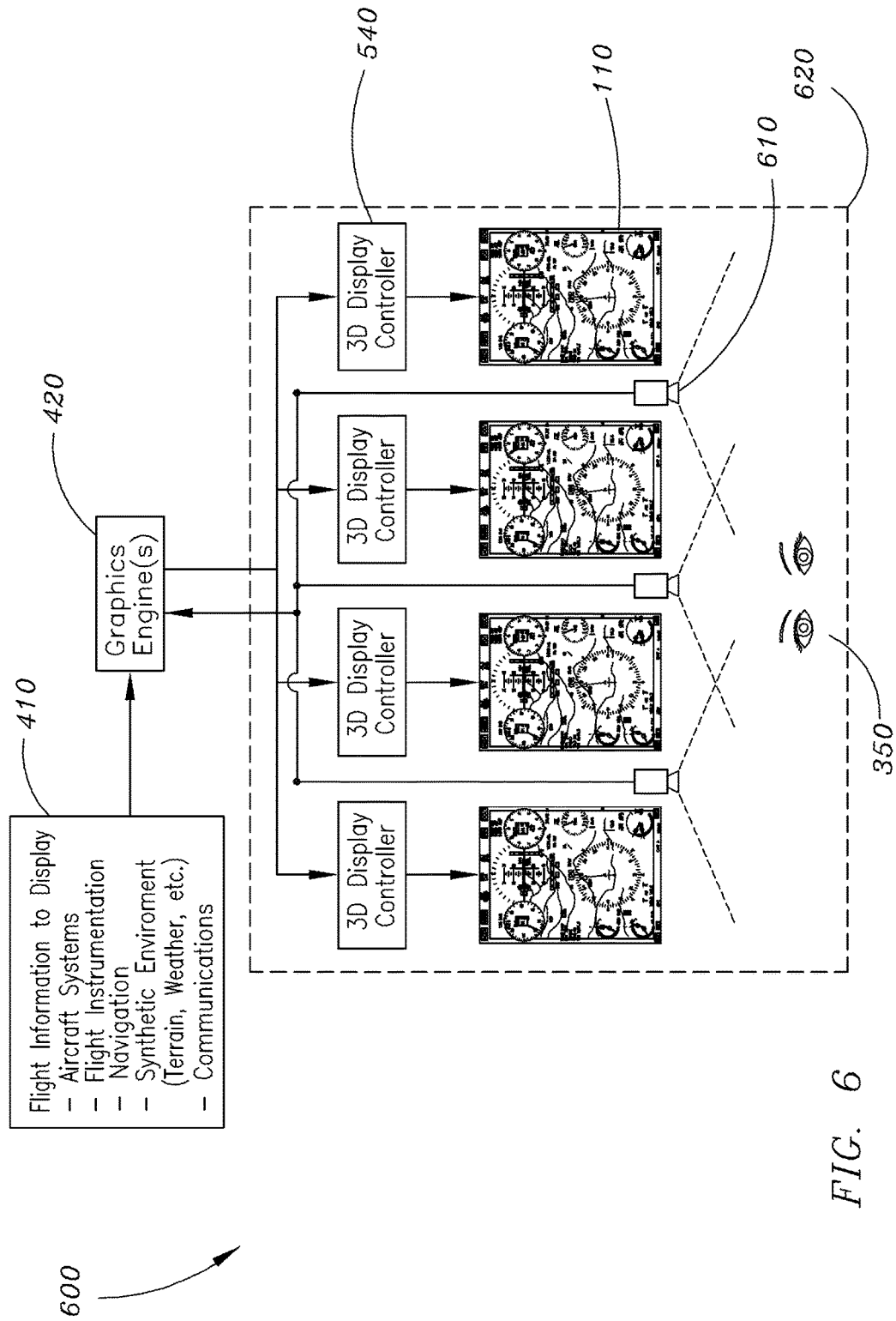
FIG. 6 is a diagram of a head tracking autostereoscopic flight display system layout in accordance with a preferred embodiment of the current invention.

Referring to FIG. 6, a diagram of a head tracking autostereoscopic flight display system layout in accordance with a preferred embodiment of the current invention is shown. For an autostereoscopic presentation, operator eye tracking may enhance the visual capabilities of system 500. System 600 may offer an autostereoscopic system 620 capability of eye tracking using eye detection devices 610 coupled to the graphics engine 520. As the eyes of the operator may move, the graphics engine 520 may present an altered image to the operator depending on eye position, distance, and direction. For example, if the operator were looking forward, the presentation may resemble a forward view of the vehicle cockpit. Should the operator look 45 degrees to the right or left, the display may become altered to accommodate the look direction and eye placement. In addition, should the operator look up or down, the presentation may change to accommodate the up/down look direction.

Additionally, system 600 may maintain proper stereoscopic correspondence between the left/right eyes and their respective left/right images utilizing active spatial separation techniques of detection device 610 coupled with graphics engine 520 to enable multi-zone autostereoscopic head/eye tracking.

One disadvantage of autostereoscopic displays that utilize fixed spatial separation techniques is that when the viewer's eyes move between fixed viewing zones (designated for left and right eyes) the viewer will perceive a psuedoscopic S3D image (e.g., the viewer can experience high degrees of "ghosting" or complete reverse stereo (e.g., complete inversion of the depth levels (background becomes foreground, etc.)). An autostereoscopic display of the present invention with an active spatial separation system can switch the content of each viewing zone to maintain correspondence between left/right eye and left/right image. In addition, the active system can be turned-off to default back to a 2-D screen with distortions from lensing or parallax barriers.

System 600 may preferably maintain correspondence between the viewer's eyes and the current viewing zone within which the eyes are located. For example, should a viewer be positioned with their right eye in viewing zone 1 and left eye in viewing zone 2, system 600 will present proper correlated image to each eye based on the zone. If the viewer's eye position moves left so that the right eye is now in viewing zone 2 and the left eye is in viewing zone 3, system 600 will sense this change and re-assign the respective images to maintain proper left/right eye-image correlation.

These content in each viewing zone can be associated with different perspectives of a S3D scene (similar to looking out a window, typically termed multi-view) or maintain eye-image correspondence of just one pair of left/right images (this is what is experienced in the video I sent to you, we only had one pair of left/right images). Multi-view S3D displays tap into the motion parallax depth cue of the human vision system.

Figure 7:
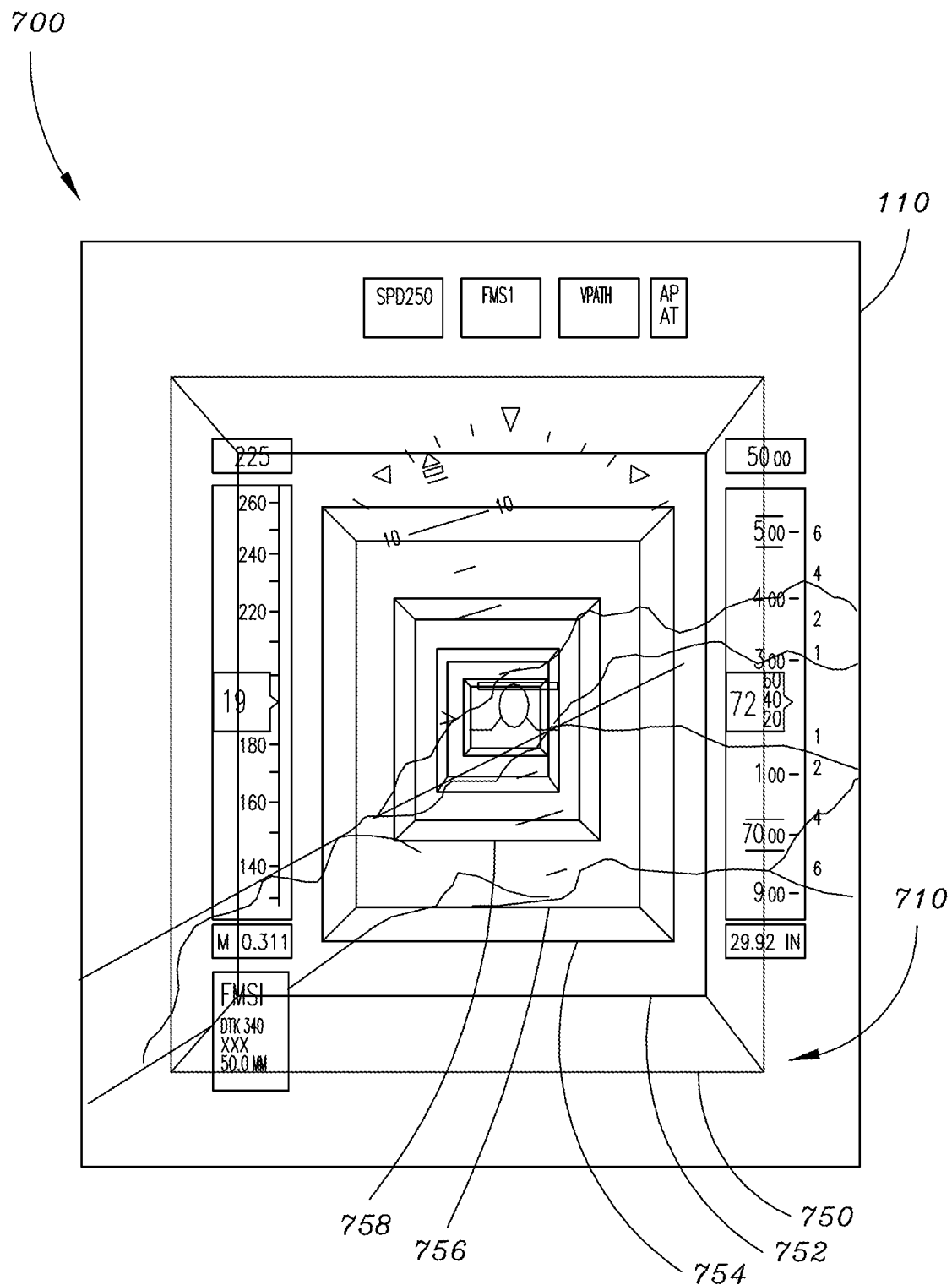
FIG. 7 is an diagram of an exemplary S3D highway-in-the-sky format in accordance with a preferred embodiment of the present invention.

Referring to FIG. 7, a diagram of an exemplary S3D highway-in-the-sky format in accordance with a preferred embodiment of the present invention is shown. A Highway In The Sky (HITS) in S3D displays may provide enhanced spatial relationship of the aircraft position relative to the environment. Display 110 may indicate the HITS symbology 710 via multiple depth layers. As the airplane moves forward over the ground, the tunnel lines will exhibit stereopsis movement toward the eye of the operator. Operational symbology may move from one depth layer to a next depth layer simulating the eye of the operator moving through the concentric boxes. From a most distal depth layer 758 through each depth layer 756, 754, 752, and 750, each navigation box may aid the operator to steer the aircraft to remain within the box. One embodiment of the HITS aspect of the present invention may be particularly configured for potentially opening additional capabilities for slow moving/high turn rate navigation typical of a helicopter.

Figure 8:
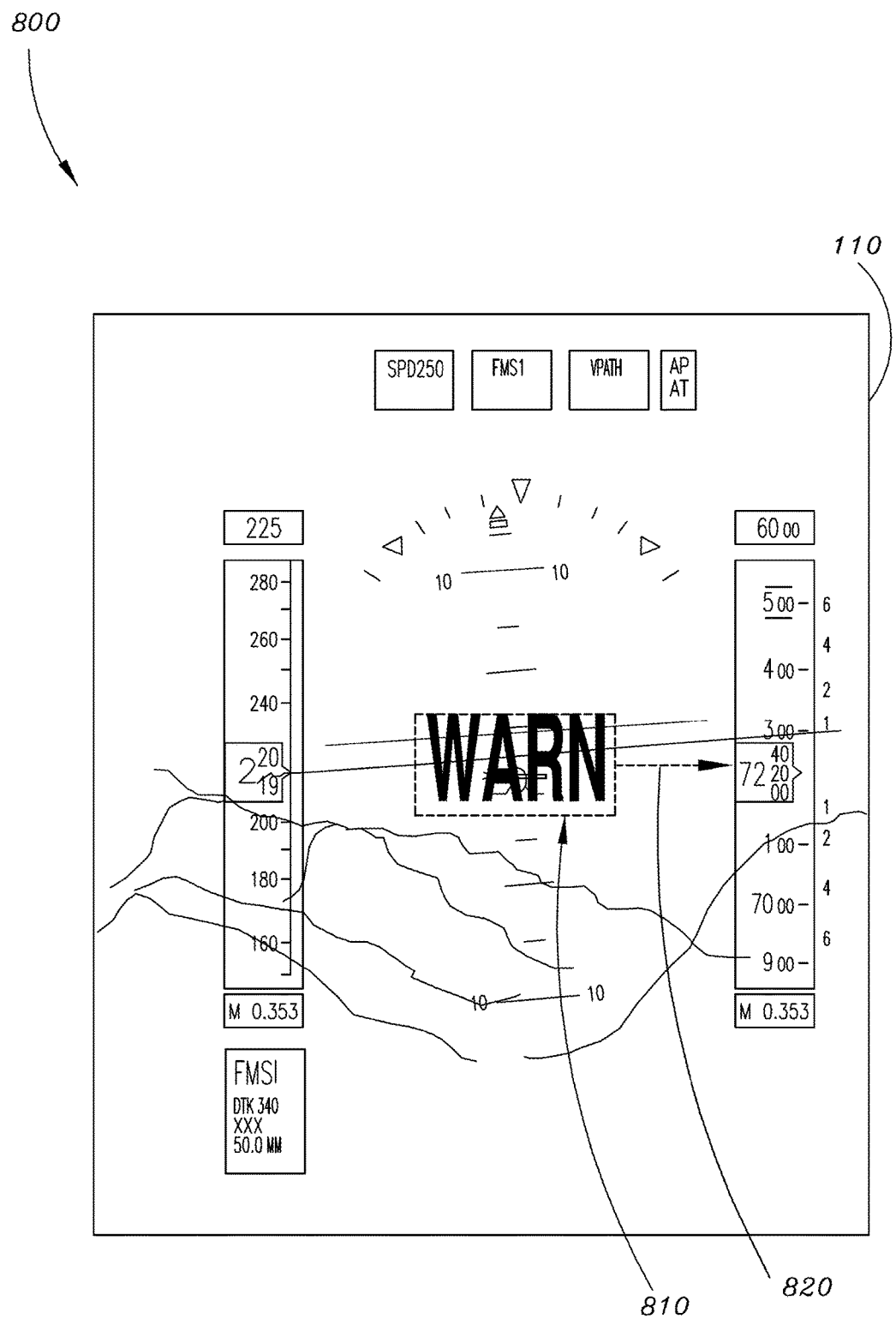
FIG. 8 is a diagram of a warning message presented to a pilot representative of a preferred embodiment of the present invention.

Referring to FIG. 8, a diagram of a warning message presented to a pilot representative of a preferred embodiment of the present invention is shown. Warning message 810 may be presented to the operator within a proximal depth layer 340 to ensure operator attention. Link line 820 described above may be pulsing, flashing, or steady and be colored similar to the warning message. Link line 820 may operate to draw operator attention from warning indication 810 in a first depth layer to the reason for the warning (here altitude) in a more distal or more proximal depth layer.

Figure 9:
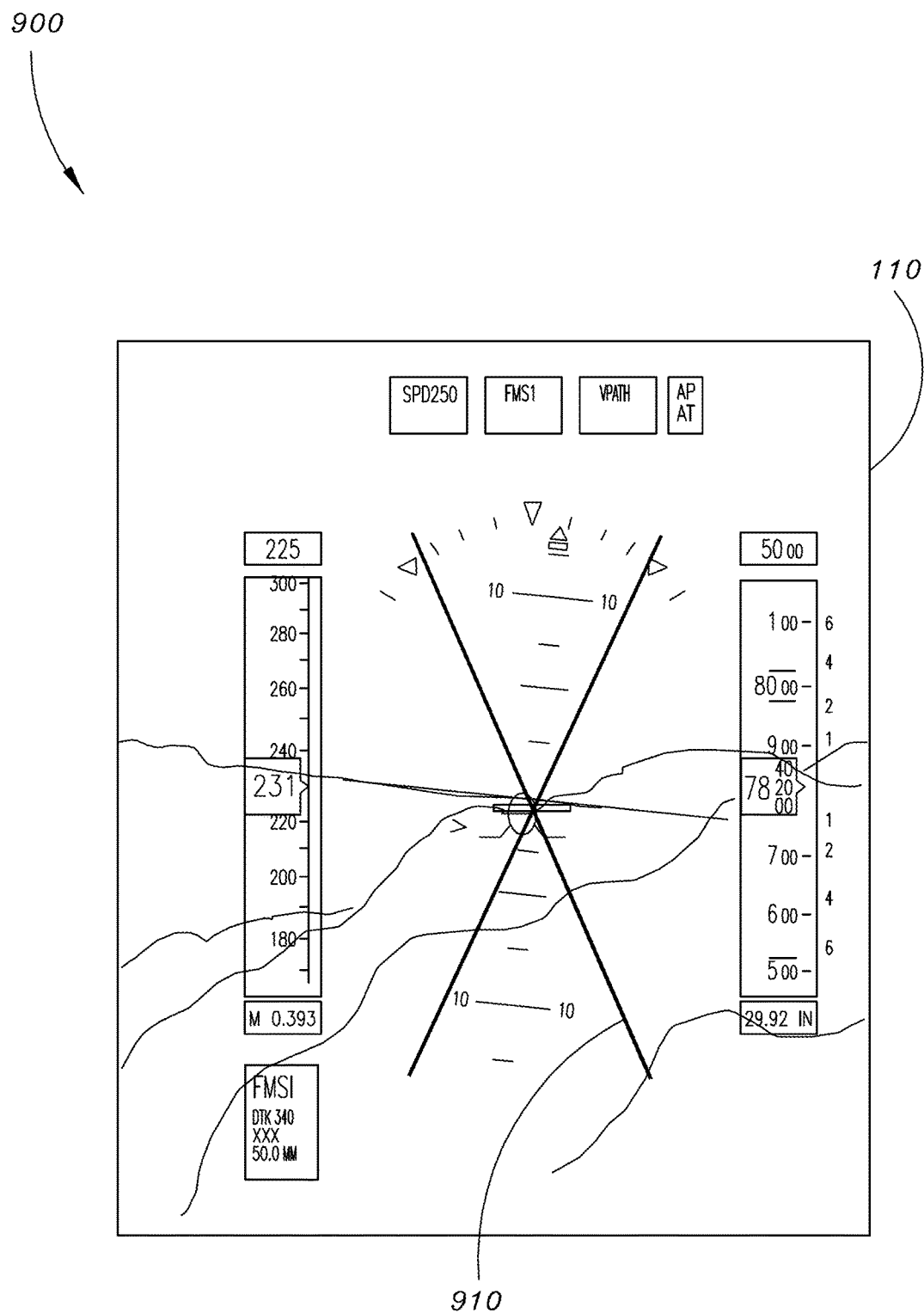
FIG. 9 is a diagram of a collision indication illustrative of a preferred embodiment of the present invention.

Referring to FIG. 9, a diagram of a collision indication illustrative of a preferred embodiment of the present invention is shown. Collision X 910 may be generated by a traffic object and placed in hierarchy Level n and proximal S3D depth layer 340 to indicate a highest priority threat. In addition, traffic object may be the result of a well-known radar return closure velocity, a TCAS RA, and similar traffic alert. As above, a fixed or pulsing link line may be presented from collision X in proximal depth layer to the threat traffic in a more distal SE depth layer.

Figure 10:
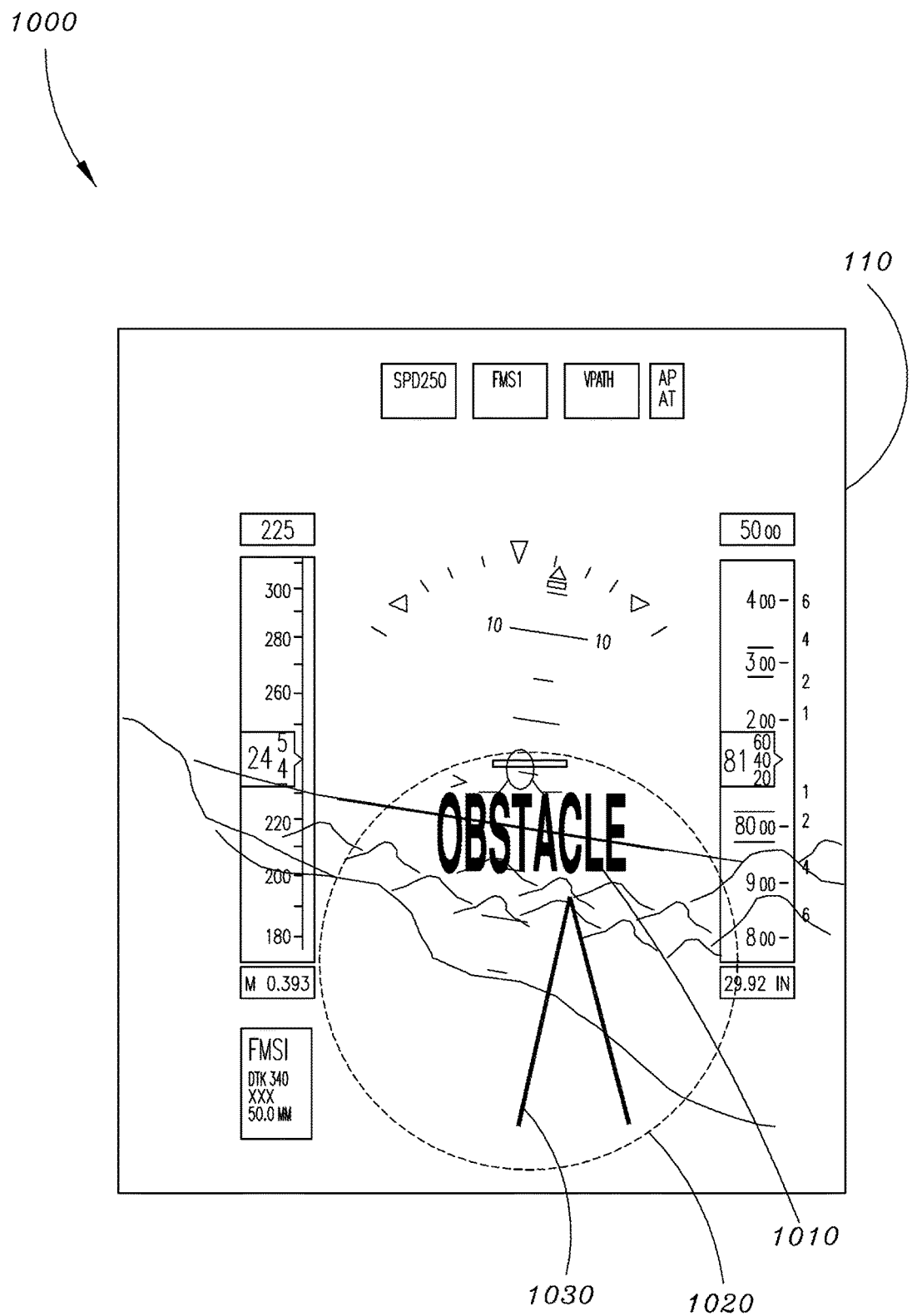
FIG. 10 is a diagram of an obstacle indication illustrative of a preferred embodiment of the present invention.

Referring to FIG. 10, a diagram of an obstacle indication illustrative of a preferred embodiment of the present invention is shown. Obstacle warning 1010 may be accompanied by obstacle cue 1030 and obstacle circle 1020. As above, obstacle warning 1010 may be presented in proximal depth layer 340 while obstacle cue 1030 and link circle may begin at a more distal depth layer and transition from more distal depth layers to more proximal depth layers as vehicle approaches the obstacle.

Figure 11:
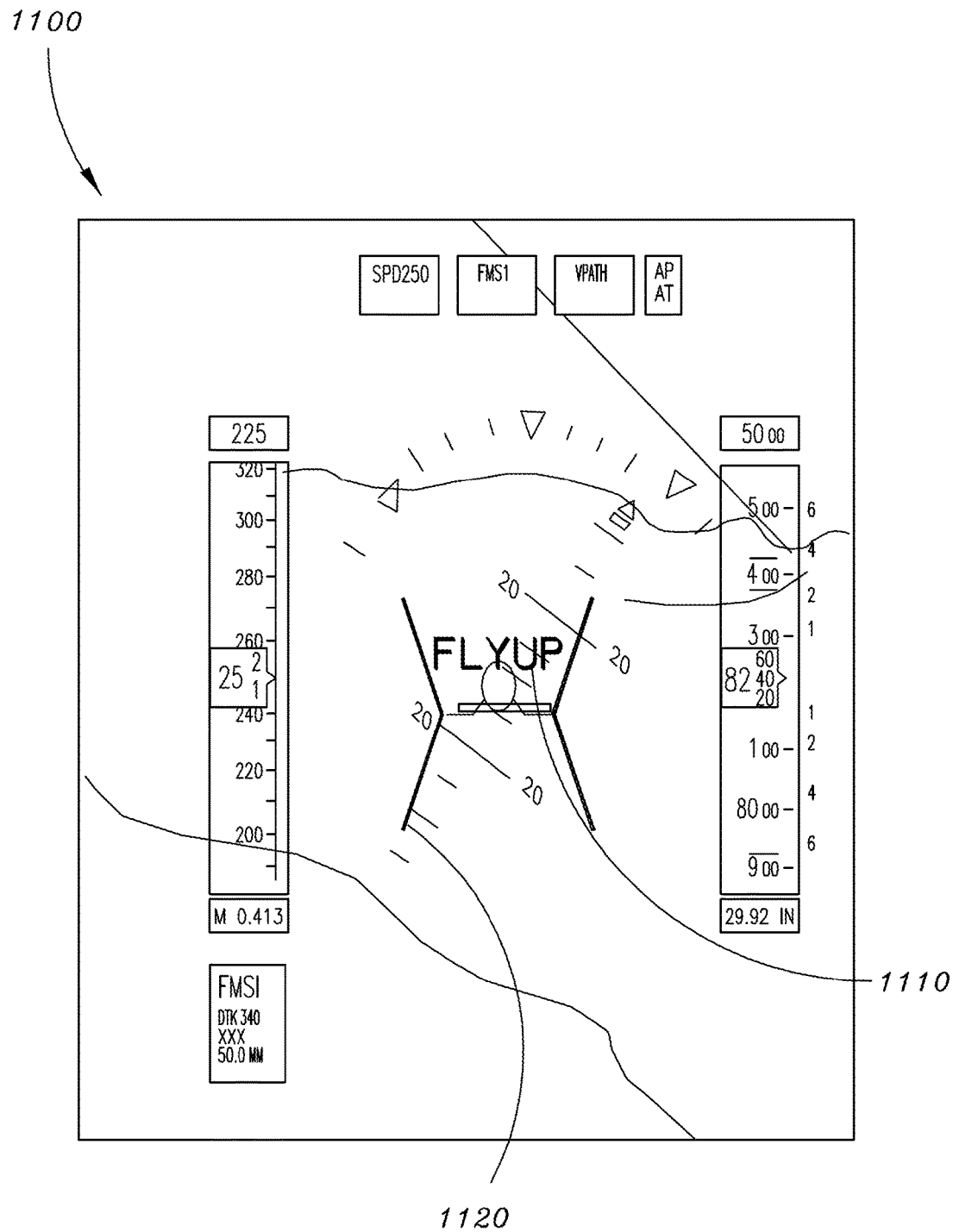
FIG. 11 is a diagram of a ground collision warning illustrative of a preferred embodiment of the present invention.

Referring to FIG. 11, a diagram of a ground collision warning illustrative of a preferred embodiment of the present invention is shown. Flyup warning 1110 may be accompanied with flyup cue 1120 to indicate a vertical change in course is required to prevent ground collision. Terrain warnings may be generated as terrain objects by a plurality of well-known sources including a radar air-to-ground ranging and DTED data coupled with accurate positioning systems. As above, Flyup warning may be presented in proximal depth layer 340 while flyup cue 1120 may be presented in a plurality of intermediate depth layers with size of the flyup cue 1120 indicating an urgency.

Figure 12:
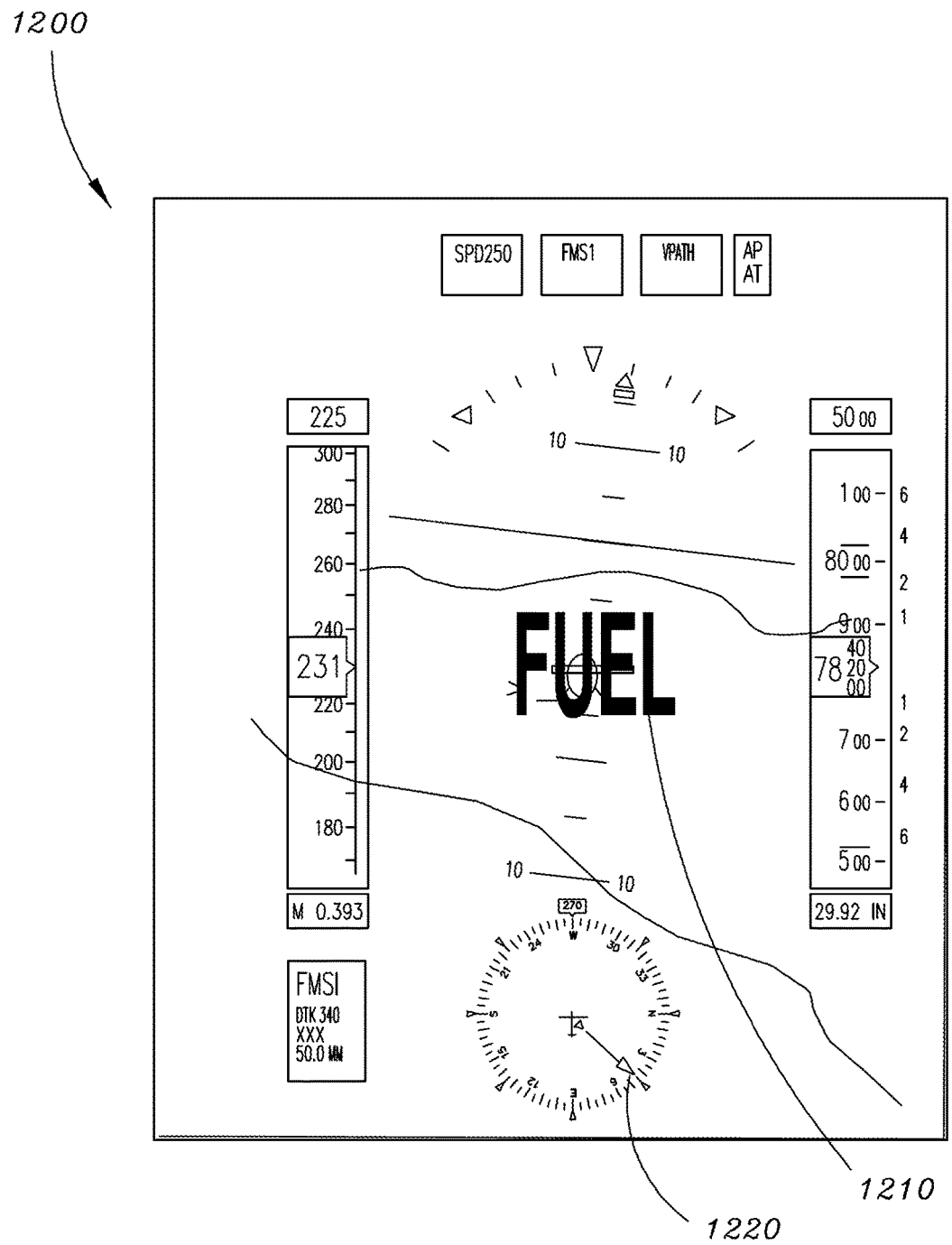
FIG. 12 is a diagram of a fuel warning message illustrative of a preferred embodiment of the present invention.

Referring to FIG. 12, a diagram of a fuel warning message illustrative of a preferred embodiment of the present invention is shown. Fuel warning 1210 may be presented in proximal depth layer 340 to capture operator attention. IN addition, an accompanying heading indication for a possible divert airfield may be presented on compass as a bingo arrow 1220.

Referring to FIG. 13, a flow diagram of a method for displaying synthetic environments with stereoscopic avionics displays representative of a preferred embodiment of the present invention is shown. Method 1300 may begin at step 1302 with receiving a plurality of objects, each of the plurality of objects an instance of one of: Synthetic Environment (SE) data and operational symbology data, for a vehicle, at step 1304, determining a presentation hierarchy of the plurality of objects, the presentation hierarchy having a plurality of levels, at step 1306, determining a first placement within the presentation hierarchy for each object of the plurality of objects, at step 1308, designating a plurality of S3D depth layers for a display of operational data, at step 1310, determining a first order of the plurality of objects within the plurality of S3D depth layers, at step 1312, reserving a proximal depth layer to the operator, of the plurality of S3D depth layers, for a warning indication, at step 1314, displaying, in the display of operational data in the vehicle, the plurality of objects within a highest level of the presentation hierarchy at the proximal depth layer, at step 1316, displaying, in the display of operational data in the vehicle, the plurality of objects within a lowest level of the presentation hierarchy at a distal depth layer from the operator, at step 1318, displaying, in the display of operational data in the vehicle, the plurality of objects within a plurality of intermediate levels of the presentation hierarchy at a plurality of intermediate depth layers based on the first placement and the first order, the proximal depth layer, the distal depth layer, and the intermediate depth layers are simultaneously displayed, at step 1320, transitioning an object from a more proximal depth layer to a more distal depth layer and vice versa, at step 1322, determining a second placement and a second order, and at step 1324, displaying, in the S3D display of operational data in the vehicle, the plurality of objects based on the transitioning, the second placement and the second order.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for stereoscopic 3-D (S3D) display of multiple layers of information to an operator, comprising;

receiving one or more display hierarchy rule sets, each of the one or more display hierarchy rule sets corresponding to the operator, and based on a nature of the corresponding operator;

receiving a plurality of objects, each of said plurality of objects an instance of one of: Synthetic Environment (SE) data and operational symbology data, and at least two of the plurality of objects being instances of Highway In The Sky markers, for a vehicle;

determining a presentation hierarchy of said plurality of objects based on a first rule set in the one or more display hierarchy rule sets associated with a first operator, said presentation hierarchy having a plurality of levels;

determining a first placement within said presentation hierarchy for each object of said plurality of objects based on the first rule set in the one or more display hierarchy rule sets;

designating a plurality of S3D depth layers for a display of operational data;

determining a first order of said plurality of objects within said plurality of S3D depth layers based on the first rule set in the one or more display hierarchy rule sets;

reserving a proximal depth layer to said operator, of said plurality of S3D depth layers, for a warning indication;

determining a multi-dimensional link line connecting the warning indication in the proximal depth layer to an associated object in said plurality of objects in a more distal depth layer of said plurality of S3D depth layers;

displaying, in said display of operational data in said vehicle, said plurality of objects within a highest level of said presentation hierarchy at said proximal depth layer;

displaying, in said display of operational data in said vehicle, said plurality of objects within a lowest level of said presentation hierarchy at a distal depth layer from said operator;

displaying, in said display of operational data in said vehicle, said plurality of objects within a plurality of intermediate levels of said presentation hierarchy at a plurality of intermediate depth layers based on said first placement and said first order, said proximal depth layer, said distal depth layer; and said intermediate depth layers are simultaneously displayed;

transitioning an object from a more proximal depth layer to a more distal depth layer and vice versa;

determining a second placement and a second order based on a second rule set in the one or more display hierarchy rule sets associated with a second operator; and displaying, in said S3D display of operational data in said vehicle, said plurality of objects based on said transitioning, said second placement and said second order.

2. The method for S3D display of multiple layers of information of claim 1, wherein said operator is an onboard or remote pilot, and said vehicle is an aircraft.

3. The method for S3D display of multiple layers of information of claim 1, wherein said display of operational data further comprises a display configured for S3D recognition by said operator without a need for said operator to wear a filter.

4. The method for S3D display of multiple layers of information of claim 1, wherein said warning further comprises at least one of: a master warning, a master caution, a terrain warning, an obstacle warning, a vehicle status message; a fuel warning, a weapons status warning, and a communication warning.

5. The method for S3D display of multiple layers of information of claim 1, wherein said Synthetic Environment (SE) data further comprises at least one of: navigation data, vehicle status data, obstacle data, terrain data, weather data, traffic data, and targeting data.

6. The method for S3D display of multiple layers of information of claim 1, wherein said operational symbology data further comprises at least one of: speed data, altitude data, attitude data, heading data, navigation data, weapons data, and targeting data.

7. The method for S3D display of multiple layers of information of claim 1, wherein said presentation hierarchy further comprises an order based at least on one of: an operational requirement, an indication of a source of said objects, a Security Classification of said objects, and an order of receipt of said plurality of objects.

8. The method for S3D display of multiple layers of information of claim 1, wherein said plurality of S3D depth layers further comprises an order based at least on one of: a danger to said vehicle, a skill level of said operator, a Security Clearance of said operator, a master mode of an onboard control computer, and a mission of said operator.

9. The method for S3D display of multiple layers of information of claim 1, wherein said display of operational data in said vehicle is configured for projection from at least one of: an instrument panel display and a helmet mounted display.

10. The method for S3D display of multiple layers of information of claim 1, wherein said display of operational data is configured via at least one of: virtually by a software module, optically without an S3D display, eyewear with filters worn by said operator, and modules within the display.

11. A system for stereoscopic 3-D (S3D) display of multiple layers of information to an operator, comprising:

a graphics engine configured to receive a plurality of objects, each of said plurality of objects an instance of one of: Synthetic Environment (SE) data and operational symbology data, and at least two of the plurality of objects being instances of Highway In The Sky markers, for a vehicle;

a non-transitory computer readable medium having computer readable program code embodied therein for S3D display of multiple layers of information to said operator, the computer readable program code comprising instructions which, when executed by a computer device or processor, perform and direct the steps of:

receiving one or more display hierarchy rule sets, each of the one or more display hierarchy rule sets corresponding to the operator, and based on a nature of the corresponding operator;

determining a presentation hierarchy of said plurality of objects based on a first rule set in the one or more display hierarchy rule sets associated with a first operator, said presentation hierarchy having a plurality of levels;

determining a first placement within said presentation hierarchy for each object of said plurality of objects based on the first rule set in the one or more display hierarchy rule sets;

designating a plurality of S3D depth layers for a display of operational data;

determining a first order of said plurality of objects within said plurality of S3D depth layers based on the first rule set in the one or more display hierarchy rule sets;

reserving a proximal depth layer to said operator, of said plurality of S3D depth layers, for a warning indication;

determining a multi-dimensional link line connecting the warning indication in the proximal depth layer to an associated object in said plurality of objects in a more distal depth layer of said plurality of S3D depth layers;

a display controller configured to receive information from said processor, and output graphics information to a display, said display configured to:

display, in said display of operational data in said vehicle, said plurality of objects within a highest level of said presentation hierarchy at said proximal depth layer;

display, in said display of operational data in said vehicle, said plurality of objects within a lowest level of said presentation hierarchy at a distal depth layer from said operator;

display, in said display of operational data in said vehicle, said plurality of objects within a plurality of intermediate levels of said presentation hierarchy at a plurality of intermediate depth layers based on said first placement and said first order, said proximal depth layer, said distal depth layer, and said intermediate depth layers simultaneously displayed; and display, in said display, the multi-dimensional link line;

said computer device or processor further configured to perform and direct the steps of:

transitioning an object from a more proximal depth layer to a more distal depth layer and vice versa;

determining a second placement and a second order based on a second rule set in the one or more display hierarchy rule sets associated with a second operator;

said display further configured to:
  display, in said S3D display of operational data in said vehicle, said plurality of objects based on said transitioning, said second placement and said second order.

12. The system for S3D display of multiple layers of information of claim 11, wherein said operator is an onboard or remote pilot, and said vehicle is an aircraft.

13. The system for S3D display of multiple layers of information to an operator of claim 11, wherein said display is configured to present visual S3D signals recognizable by said operator without a need for said operator to wear a filter.

14. The system for S3D display of multiple layers of information to an operator of claim 11, wherein said warning further comprises at least one of; a master warning, a master caution, a terrain warning, an obstacle warning, a vehicle status message, a fuel warning, a weapons status warning, and a communication warning.

15. The system for S3D display of multiple layers of information to an operator of claim 11, wherein said Synthetic Environment (SE) data further comprises at least one of: navigation data, vehicle status data, obstacle data, terrain data, weather data, traffic data, and targeting data.

16. The system for S3D display of multiple layers of information to an operator of claim 11, wherein said operational symbology data further comprises at least one of: speed data, altitude data, attitude data, heading data, navigation data, weapons data, and targeting data.

17. The system for S3D display of multiple layers of information to an operator of claim 11, wherein said presentation hierarchy further comprises an order based at least on one of: an operational requirement, an indication of a source of said objects, a Security Classification of said objects, and an order of receipt of said plurality of objects.

18. The system for S3D display of multiple layers of information to an operator of claim 11, wherein said plurality of S3D depth layers further comprises an order based at least on one of: a danger to said vehicle, a skill level of said operator, a Security Clearance of said operator, a master mode of an onboard control computer, and a mission of said operator.

19. The system for S3D display of multiple layers of information to an operator of claim 11, wherein said display is at least one of: an instrument panel display and a helmet mounted display.

20. The system for S3D display of multiple layers of information to an operator of claim 11, wherein said display of operational data is configured via at least one of: virtually by a software module, optically without an S3D display, eyewear with filters worn by said operator, and modules within the display.

* * * * *